US008547998B2

(12) United States Patent
Moon et al.

(10) Patent No.: US 8,547,998 B2
(45) Date of Patent: Oct. 1, 2013

(54) TUNNELING IPV6 PACKET THROUGH IPV4 NETWORK USING A TUNNEL ENTRY BASED ON IPV6 PREFIX AND TUNNELING IPV4 PACKET USING A TUNNEL ENTRY BASED ON IPV4 PREFIX

(75) Inventors: Seong Moon, Daejeon (KR); Sung Back Hong, Daejeon (KR); Ho Yong Ryu, Daejeon (KR); Sun Cheul Kim, Daejeon (KR); Pyung Koo Park, Daejeon (KR); Ho Sun Yoon, Daejeon (KR); Young Soo Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 272 days.

(21) Appl. No.: 12/808,413

(22) PCT Filed: Oct. 10, 2008

(86) PCT No.: PCT/KR2008/006003
§ 371 (c)(1),
(2), (4) Date: Jun. 16, 2010

(87) PCT Pub. No.: WO2009/078564
PCT Pub. Date: Jun. 25, 2009

(65) Prior Publication Data
US 2010/0260203 A1    Oct. 14, 2010

(30) Foreign Application Priority Data
Dec. 17, 2007 (KR) .................. 10-2007-0132810

(51) Int. Cl.
*H04J 3/16* (2006.01)
(52) U.S. Cl.
USPC ........................................... 370/467

(58) Field of Classification Search
USPC ......... 370/203, 229–240, 241–253, 254–258,
370/298–306, 351–356, 357–395.2, 395.21,
370/395.3, 395.31, 395.32, 395.4, 395.41,
370/395.42, 395.43, 395.5, 395.52, 395.53,
370/395.54, 395.6, 395.61, 396–411, 412–429,
370/503–520
See application file for complete search history.

(56) References Cited

U.S. PATENT DOCUMENTS

| 7,305,481 B2 | 12/2007 | Blanchet et al. |
| 2004/0133692 A1* | 7/2004 | Blanchet et al. .............. 709/230 |

(Continued)

FOREIGN PATENT DOCUMENTS
KR    10-2008-0050199    6/2008

OTHER PUBLICATIONS

B. Carpenter et al., "Connection of IPv6 Domains via IPv4 Clouds," IETF (The Internet Engineering Task Force), RFC 3056, Feb. 2001, pp. 1-23.

(Continued)

*Primary Examiner* — Jung-Jen Liu
(74) *Attorney, Agent, or Firm* — Staas & Halsey LLP

(57) ABSTRACT

The present invention relates to tunneling an IPv6 packet through an IPIv4 network. In using a tunneling method upon transmitting an IPv6 packet in an IP network, when destination nodes desired to be communicated are located within the same IPv6 prefix network, IPv6 prefix information is added for the management of a tunnel entry. Hence, tunneling information on terminals located within the same IPv6 prefix network can be managed as one tunnel entry. Accordingly, the time consumed when retrieving a tunnel entry can be reduced.

21 Claims, 7 Drawing Sheets

(56) References Cited

U.S. PATENT DOCUMENTS

2004/0179532 A1    9/2004    Thubert et al.
2005/0152298 A1    7/2005    Thubert et al.
2006/0259639 A1*  11/2006  Aken et al. .................... 709/245
2007/0268885 A1*  11/2007  Ford et al. ..................... 370/351

OTHER PUBLICATIONS

International Search Report for PCT/KR2008/006003, mailed on Mar. 18, 2009.

* cited by examiner a)
| IPv6 address | Local IPv4 address | Remote IPv4 address | Local UDP Port# | Remote UDP Port# |
|---|---|---|---|---|
| 3ffe:100:1 | 30.30.30.1 | 40.40.40.1 | 5550 | 5550 |
| 3ffe:100:2 | 30.30.30.1 | 40.40.40.1 | 5550 | 5550 |
| 3ffe:100:3 | 30.30.30.1 | 40.40.40.1 | 5550 | 5550 | b)
| IPv6 address | Local IPv4 address | Remote IPv4 address | Local UDP Port# | Remote UDP Port# |
|---|---|---|---|---|
| 3ffe:100::/32 | 30.30.30.1 | 40.40.40.1 | 5550 | 5550 |

TUNNELING IPV6 PACKET THROUGH IPV4 NETWORK USING A TUNNEL ENTRY BASED ON IPV6 PREFIX AND TUNNELING IPV4 PACKET USING A TUNNEL ENTRY BASED ON IPV4 PREFIX

CROSS REFERENCE TO RELATED APPLICATIONS

This application claims the benefit under 35 U.S.C. Section 371, of PCT International Application No. PCT/KR2008/006003, filed Oct. 10, 2008, which claimed priority to Korean Application No. 10-2007-0132810, filed Dec. 17, 2007, the entire disclosures of which are incorporated by reference as a part of this application.

TECHNICAL FIELD

The present invention relates to a method for converting an IPv6 packet so as to be transmitted through an IPv4 network in case of tunneling an IPv6 packet through an IPv4 network in an IP-based network, its system, and a method for establishing an IPv6 tunneling path.

This work was supported by the IT R & D program of MIC/IITA [2007-S-013-01, "R&D on all IPv6 based Fixed-Mobile convergence networking technology"].

BACKGROUND ART

Currently, in the field of networks, many researches are underway to provide an internet service without interruption even if a terminal moves to another IP network by using an ALL IP network. Among them, there is a method for ensuring packet transmission by a tunneling method by assigning a unique IPv6 address to a terminal on the move.

By using the tunneling method, the terminal on the move recognizes the IPv6 address assigned to itself as an address allowing it to reach a network all the time. Therefore, application programs of a mobile terminal perform communications by using the IPv6 address. IP address information that is changed as the terminal accesses another IP network while moving is used as transmission means for forwarding the original IPv6 packet. The original IPv6 packet used in the application programs is tunneled by using <current IP network information of the mobile terminal and current IP network information of a destination node> so that it can be correctly delivered to the destination node through the IP network where the terminal is currently located.

FIG. 1 shows the overview of a network for ensuring the mobility of a terminal in such a tunneling method. Mobile terminals 101, 105, and 106 connect to a new IP network and perform communications with destination nodes 110 and 111 as they are continuously on the move. A server 100 manages information for tunneling based on current IP network information that is changed whenever each mobile terminal moves from an area to another area. The server 100 exchanges information with the mobile terminals, a gateway and so on so that each of the mobile terminals and each of the destination nodes can communicate smoothly through a tunnel.

In FIG. 1, the gateway 109 provides the function of linking an IPv4 network and an IPv6 network. Under this circumstance, in order to provide tunneling to the mobile terminals 105 and 106 connected to an address conversion apparatus, such as an NAT apparatus 103, UDP port information, as well as IP address information, is utilized. In order to provide tunneling to the mobile terminal 101 directly connected to a public network via a router 102, only IP address information is used.

FIG. 1 shows tunnels 107 and 108 which are used for the server 100 and the mobile terminal 106 to communicate with the destination nodes 110 and 111. These tunnels are an IPv6-over-IPv4 tunnel 108 and an IPv6-over-IPv4-UDP tunnel 107.

As shown in FIG. 2, a sever or terminal 200 attempting to ensure the mobility of a terminal by using such a tunneling method creates a tunnel network interface 207 for dealing with a tunneling-related process. When an application program 201 transmits an IPv6 packet, this packet is transmitted to an IPv6 protocol stack 205 through a socket layer 202 and a TCP/UDP layer 203. The IPv6 protocol stack 205 retrieves an FIB6 211, which is a Forwarding Information Base for IPv6, to determine which network interface a packet currently requested to be transmitted is to be transmitted through. At this time, the FIB6 is established so that a packet using tunneling can be transmitted through a tunnel network interface. Hence, the packet requested to be transmitted is forwarded to the tunnel network interface 207.

The tunnel network interface 207 that has received the packet to be transmitted retrieves tunneling information in a tunnel table 213 by using, as a key value, an IPv6 address of the destination node of a packet to be currently transmitted. The tunneling information retrieved includes a local IPv4 address, a destination IPv4 address, a local UDP port number, a destination UDP port number (212, 214), and so forth. The original IPv6 packet is encapsulated with an IPv4 header and a UDP header by using the thus retrieved tunneling information, and then delivered to the other node, i.e., the destination node, through a physical network interface 206 by using an IPv4 protocol stack 204.

As above, in the method of managing tunnel information in a tunnel network interface, even if destination nodes are located within an IPv6 network (hereinafter, referred to as an IPv6 prefix network) having the same IPv6 prefix, a tunnel entry for the destination nodes must be managed by destination node.

DISCLOSURE OF INVENTION

Technical Problem

The present invention allows to efficiently manage a tunnel table used when a server, a mobile terminal, a gateway, or the like establishes a tunneling path in a network for transmitting a packet by a tunneling method in order to ensure the mobility of a terminal. That is, in a case where destination nodes are located within the same IPv6 network when managing a tunnel entry of the tunnel table, the inconvenience of having to manage tunneling information by destination node is eliminated. By this, tunnel entry management can be efficiently done, and the consumption of the related memory resources can be reduced, and the retrieval time of a tunnel entry can be reduced.

Solution to Problem

The present invention relates to an IPv6 packet conversion method for tunneling an IPv6 packet through an IPv4 network, in which the IPv6 packet is converted so as to be transmitted through the IPv4 network, comprising the steps of: retrieving a tunneling information table which uses a prefix value of a network to which a destination node to which the IPv6 packet is to be transmitted is connected; and converting the IPv6 packet into an IPv4 format according to the retrieved tunneling information.

The present invention relates to a system for tunneling an IPv6 packet through an IPv4 network, comprising: an IPv6 protocol stack for determining which network interface an IPv6 packet requested to be transmitted is to be transmitted through by retrieving an FIB6 (Forwarding Information Base for IPv6) of the IPv6 packet; a tunnel network interface for, if the IPv6 protocol stack determines that the IPv6 packet is to be transmitted through tunneling, retrieving a tunneling information table which uses a prefix value of a network connected to the destination node of the IPv6 packet as a tunnel entry, and converting the IPv6 packet into an IPv4 format according to the retrieved tunneling information; and an IPv4 protocol stack for transmitting the IPv6 packet converted in the tunnel network interface to the destination node through a physical network interface.

The present invention relates to a method for establishing an IPv4 tunneling path, in which a tunneling path is established in order to transmit an IPv4 packet through an IPv4 network, comprising the steps of: retrieving a tunneling information table which uses a prefix value of a network to which a destination node to which the IPv4 packet is to be transmitted is connected; and establishing a tunneling path according to the retrieved tunneling information to transmit the IPv4 packet.

In a conventional method for managing a tunnel entry in a server or terminal for ensuring the mobility of a terminal using tunneling, the IPv6 prefix concept does not exist, and hence there is the inconvenience of having to manage tunnel entries for the destination nodes located within the same IPv6 prefix network one by one. Thereupon, in the present invention, an IPv6 prefix length, as well as an IPv6 address value, is managed as a key value when managing the tunnel entries.

Advantageous Effects of Invention

Accordingly, it is possible to eliminate the load of having to manage tunnel entry information for the destinations nodes located within the same IPv6 prefix one by one, and thus reduce the waste of memory resources.

Furthermore, because the number of tunnel entries requiring management is reduced, the retrieval time of a tunnel entry can be shortened.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
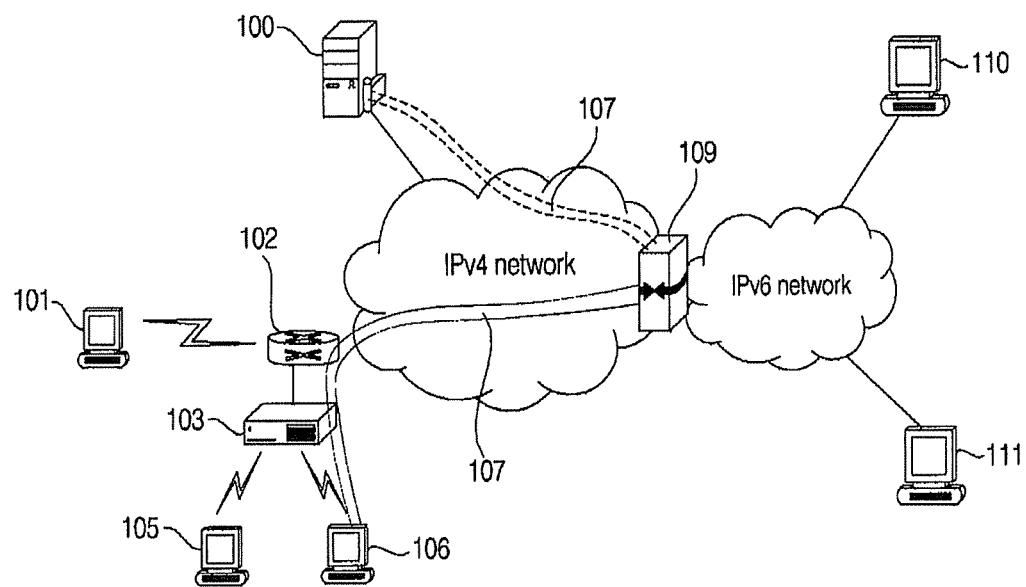
FIG. 1 is a structural view of a network providing the mobility of a terminal by a tunneling method in an ALL IP network.
Figure 2:
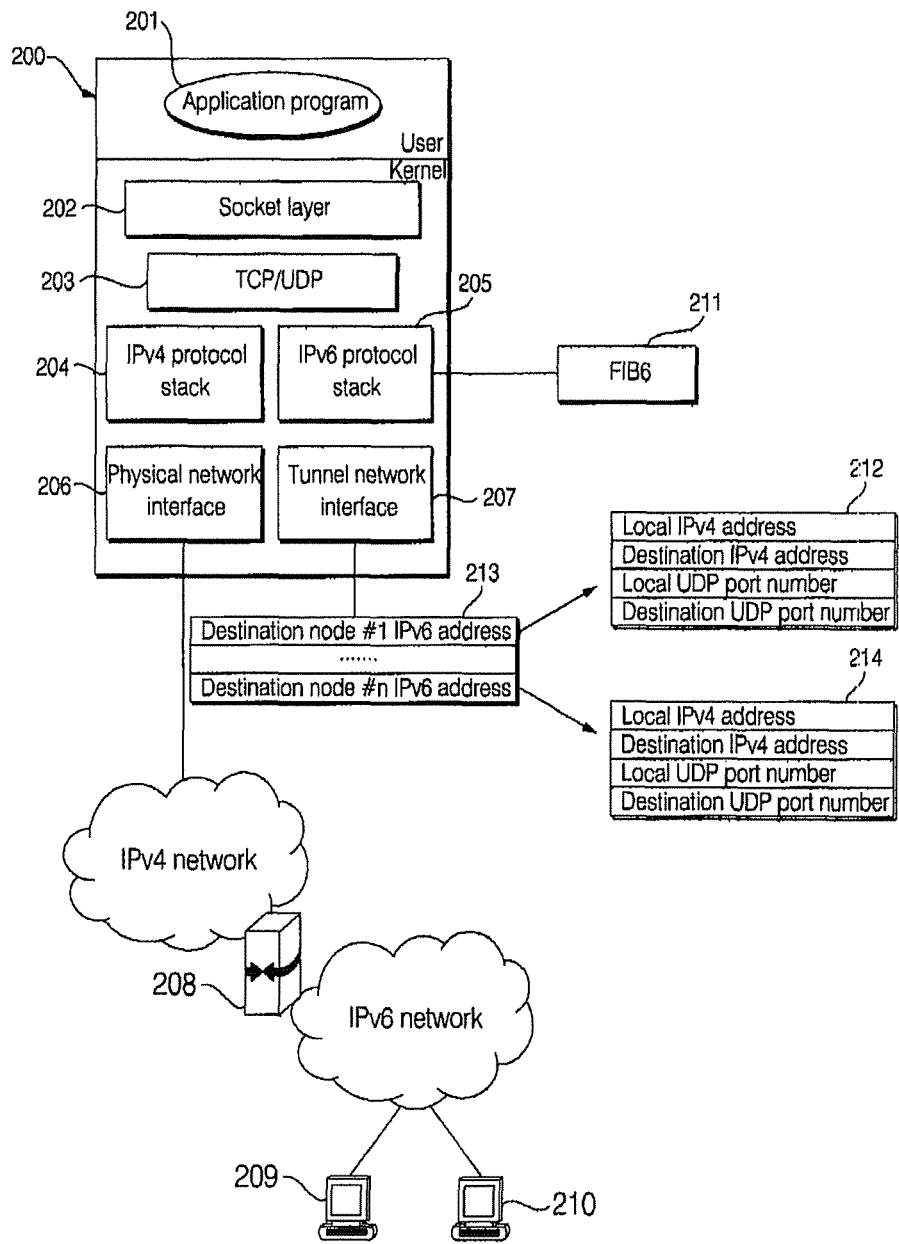
FIG. 2 is a structural view of a communication stack related to a tunnel network interface in a server and a mobile terminal which attempt to provide the mobility of the terminal by tunneling.

Details of other embodiments are included in the detailed description and drawings.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

In the present invention, in a case where destination nodes desired to be communicated are located within an IPv6 network using the same IPv6 prefix, in order to eliminate the inconvenience of having to manage tunnel entry information for respective other nodes one by one, IPv6 prefix information is utilized.

Figures 3, 4:
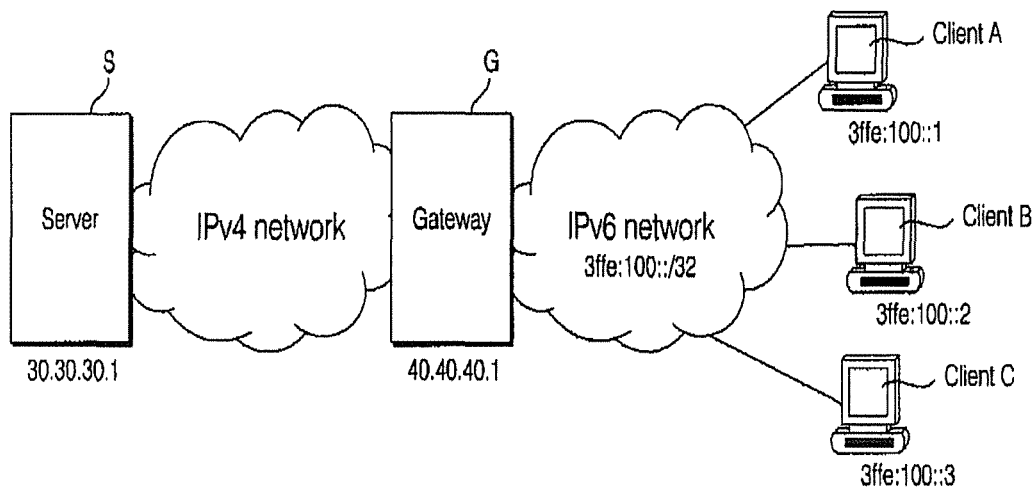
FIG. 3 is a structural view illustrating a first embodiment of a system for converting an IPv6 packet into an IPv4 format according to the present invention.
FIG. 4 is a view illustrating a tunneling information table to be referred in packet conversion in FIG. 3.

FIG. 3 is a view illustrating a first embodiment of a system for transmitting an IPv6 packet to an IPv4 network according to the present invention.

A server S transmits an IPv6 packet to destination nodes (Client A, Client B, and Client C) assigned with an IPv6 address. The server S transmits the IPv6 packet to the destination nodes through a gateway G. The server S refers to a tunneling information table as shown in graph (b) of FIG. 4 in order to establish a transmission path to the destination nodes.

In FIG. 3, an IPv4 address assigned to the server S attempting to tunnel the IPv6 packet through the IPv4 network is '30. 30. 30. 1'. An IPv4 address assigned to the gateway G for connecting between an IPv6 network connected to the destination nodes (Client A, Client B, and Client C) and the IPv4 network to which the IPv6 packet converted into an IPv4 packet format is to be transmitted is '40. 40. 40. 1'.

A prefix value of the IPv6 network connected to the destination nodes (Client A, Client B, and Client C) is '3ff3:100::/32'. IPv6 addresses assigned to the destination nodes (Client A, Client B, and Client C) are 'ff3:100::1', '3ff3:100::2', and '3ff3:100::3', respectively.

a) of FIG. 4 is a tunneling information table to be referred when the server converts an IPv6 packet into an IPv4 format according to a general method. As shown therein, addresses assigned to destination nodes (Client A, Client B, and Client C) are a tunnel entry. Hence, local and destination IPv4 addresses (Local/Remote IPv4 addresses) and local and destination UDP port numbers (Local/Remote UDP Port #) are stored in the tunneling information table by destination address.

According to a general method, in order to establish a tunneling path for transmitting an IPv6 packet to a destination node from the server, the tunnel entry of the tunneling information table is retrieved by using the address of the destination node as a key value.

b) is a tunneling information table to be referred when the server converts an IPv6 packet into an IPv4 format according to the present invention. As shown therein, a prefix value (3ffe:100::/32) of an IPv6 network connected to destination nodes (Client A, Client B, and Client C) is a tunnel entry. Hence, tunneling information of the destination nodes (Client A, Client B, and Client C) is stored through one tunnel entry.

According to the present invention, in order to establish a tunneling path for transmitting an IPv6 packet to a destination node from the server, the tunnel entry of the tunneling information table is retrieved by using the prefix value of the IPv6 network connected to the destination node as a key value.

Accordingly, the server S retrieves tunneling information consisting of an 'IPv4 address' or an 'IPv4 address and an UDP port number' to be appended to the IPv6 packet to be transmitted to a destination node through the tunneling information table as shown in b) of FIG. 4. Through the 'IPv4 address', or the 'IPv4 address and UDP port number' included in the retrieved tunneling information, the IPv4 packet is converted into the IPv4 format and transmitted to the IPv4 network.

A mobile terminal or server constituting the destination node of the present invention implements two types of protocol stacks, i.e., IPv4 and IPv6. In this structure, if the mobile terminal or server is connected to an IPv6 node, the IPv6 stack is used, and if the mobile terminal or server is connected to an IPv4 node, the IPv4 stack is sued by using an IPv4-over-IPv6 tunneling mechanism, thereby enabling communication.

A tunnel entry management system 300 used in the mobile terminal or server will be described below with reference to FIG. 5. An application program 301 generates an IPv6 packet which has to be transmitted through the IPv4 network, and the IPv6 packet is transmitted to an IPv6 protocol stack 305 through a socket layer 302 and a TCP/UDP layer 303.

The IPv6 protocol stack 305 determines which network interface the packet transmitted by the application program 301 is to be transmitted through by retrieving an FIB6 311 of IPv6. If it is determined that tunneling is to be used according to the setting in the FIB6 311, the IPv6 packet transmitted by the application program 301 is transmitted to the tunnel network interface 307.

The tunnel network interface 307 deals with a tunneling-related process in order to provide the mobility of a terminal in the mobile terminal or server of the present invention.

The server or mobile terminal of the present invention constructs an internal tunneling information table 313 managed by the tunnel network interface 307 such that not <IPv6 address value> but <IPv6 prefix, IPv6 prefix length> can be used as a key (or tunnel entry) as shown in FIG. 4. By this, tunnel entries for the destination nodes located within the same IPv6 prefix network are not managed one by one, but managed as one tunnel entry.

That is, in the present invention, tunneling information is grouped depending on the IPv6 prefix and prefix length information of the IPv6 network connected to the destination nodes when it is stored in the tunneling information table. The number of tunnel entry information of the destination nodes #1 309 and #310 connected to the IPv6 network A having the same IPv6 prefix and prefix length information is one.

Figure 5:
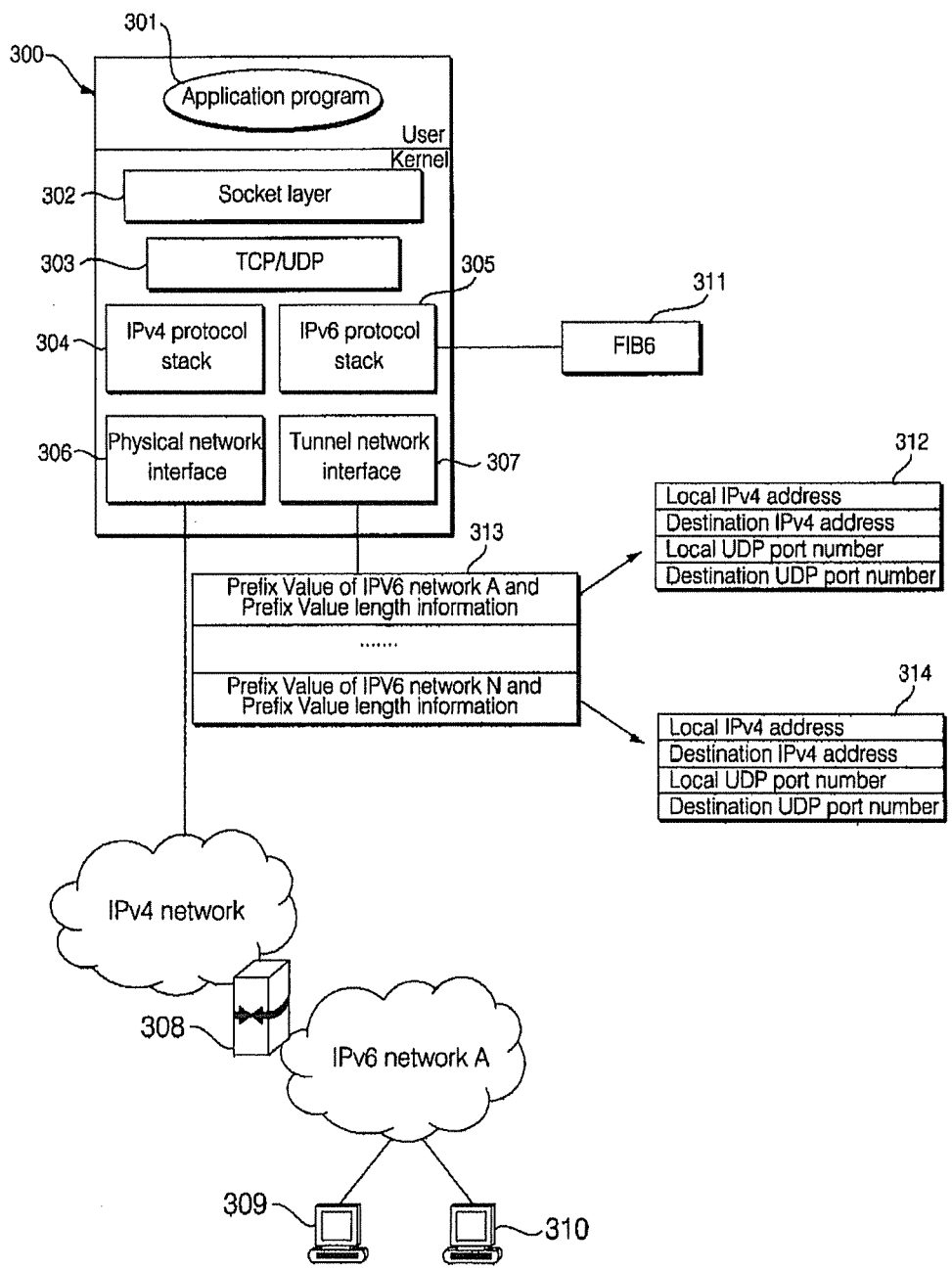
FIG. 5 is a structural view of a communication stack related to a tunnel network interface for managing a tunnel entry by using an IPv6 prefix.

As shown in the tunneling information table 313 of FIG. 5, tunneling information for the destination nodes #1 to #n located in the same IPv6 prefix network is managed as one tunnel entry by using the <IPv6 prefix and prefix length of IPv6 network>.

Local and destination IPv4 addresses and local and destination UDP port numbers 312 and 314 required for establishing a tunneling path are stored for each tunnel entry.

Figure 6:
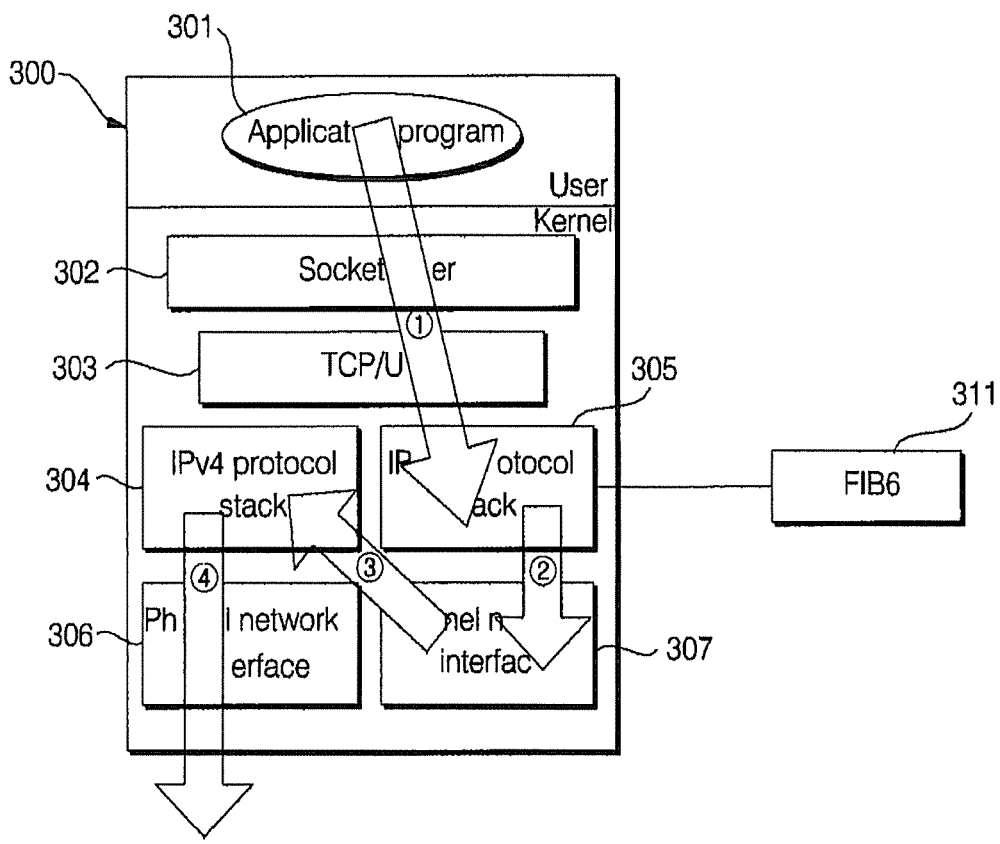
FIG. 6 is a view illustrating a path through which an IPv6 packet is converted and transmitted in FIG. 5.

The procedure of transmitting a packet to the destination nodes 309 and 310 by using the tunneling information table constructed as above based on FIG. 5 is as illustrated in FIG. 6. The application program 301 requests the IPv6 protocol stack 305 to transmit a packet by using the socket layer 302. The IPv6 protocol stack 305 retrieves the FIB6 311 in order to determine which network interface a received packet is to be transmitted through (①).

In the FIB6 311, the packets having to provide the mobility of a terminal are set so as to be transmitted by using the tunnel network interface 307. Thus, the packet requested to be transmitted is delivered to the tunnel network interface 307 (②).

The tunnel network interface 307 having received the packet to be transmitted retrieves the tunneling information table 313 in order to find IPv4 information and UDP information for tunneling. At this time, the tunnel entry longest-matching with the IPv6 destination address is used by utilizing the IPv6 destination address of the packet to be transmitted.

If it is desired to transmit data to the destination node #1 connected to the IPv6 network A among various tunneling information 312 and 314 stored in the tunneling information table 313, the tunneling information 312 matching with the destination IPv6 prefix information included in an IPv6 packet is retrieved. According to the retrieved tunneling information 312, the tunnel network interface 307 converts the IPv6 packet into an IPv4 format and delivers it to an IPv4 protocol stack 304 (③).

The IPv4 protocol stack 304 transmits the IPv6 packet converted through a physical network interface 306 to the IPv4 network (④).

Figure 7:
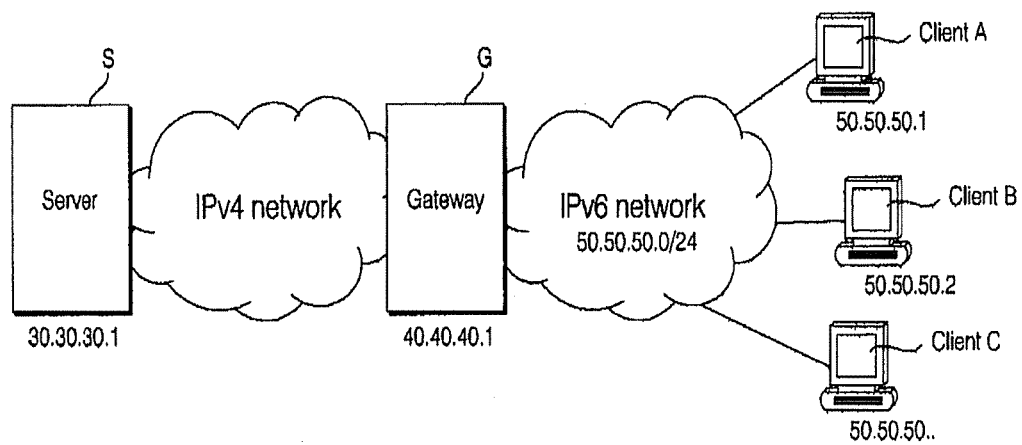
FIG. 7 is a structural view illustrating a second embodiment of a system for converting an IPv6 packet into an IPv4 format according to the present invention.

FIG. 7 is a view illustrating another embodiment of a system for tunneling an IPv4 packet through an IPv4 network, which is another field in which the present invention can be applied. Destination nodes (Client A, Client B, and Client C) are connected to an IPv4 network having '50. 50. 50. 0/24' as a prefix value. IPv4 addresses '50. 50. 50. 1', '50. 50. 50. 2', and '50. 50. 50. 3' are respectively assigned to the destination nodes (Client A, Client B, and Client C).

An IPv4 address assigned to the server S attempting to acquire a tunneling transmission path to the destination nodes (Client A, Client B, and Client C) is '30. 30. 30. 1'. An IPv4 address assigned to the gateway G for connecting an IPv4 network connected to the server S and an IPv4 network connected to the destination nodes (Client A, Client B, and Client C) is '40. 40. 40. 1'.

As shown in the drawing, a tunneling information table managed and retrieved in the tunnel network interface of the server S uses the prefix value '50. 50. 50. 0/24' assigned to the IPv4 network connected to the destination nodes (Client A, Client B, and Client C) as a tunnel entry value.

Accordingly, when retrieving the tunneling information table in order to transmit an IPv4 packet to the destination nodes, the server S uses a prefix value of the IPv4 network connected to the destination nodes as a key value.

In this case, as seen in the table as shown in FIG. 7, the server S manages the tunneling information table that uses the prefix value of the IPv4 network connected to the destination nodes (Client A, Client B, and Client C) as a tunnel entry. This tunneling information table is different from a general tunneling information table that uses an address assigned to a destination node as a tunnel entry.

The server S retrieves tunneling information matching with the IPv4 address of the destination node to which an IPv4 packet is to be transmitted and the prefix value of the network. If the destination node tunneling information is grouped in units of a prefix value and prefix length information of the network connected to the destination nodes, the server S retrieves tunneling information longest-matching with the IPv4 address of the destination node and the prefix value of the network.

The server S establishes a tunneling path through which an IPv4 packet is to be transmitted according to the retrieved tunneling information.

Figure 8:
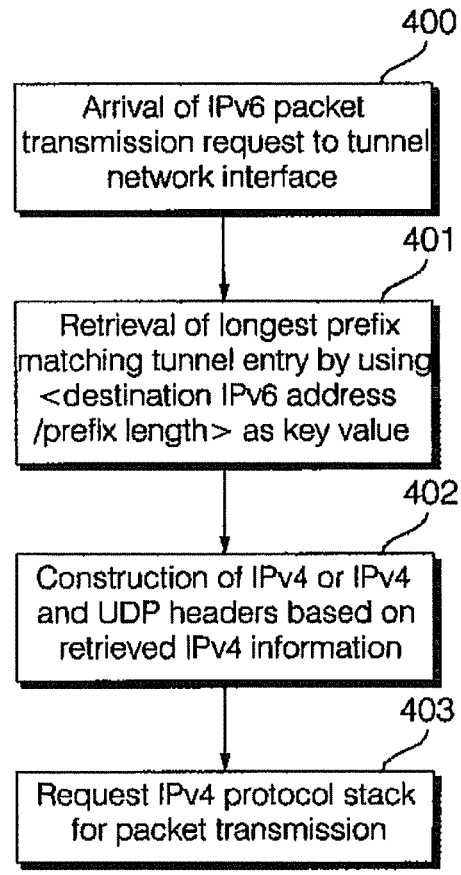
FIG. 8 is a sequential view for retrieving a tunnel entry based on IPv6 prefix information when transmitting an IPv6 packet in the present invention.

FIG. 8 shows in more detail how to retrieve a tunnel entry upon arrival of an IPv6 packet transmission request in the tunnel network interface.

The tunnel network interface 307 extracts an IPv6 destination address of a packet to be transmitted, and retrieves a longest prefix matching tunnel entry by using <destination IPv6 address/prefix> as a key value (401). The longest prefix matching is a method for using a longest prefix matching tunnel entry when there exist tunnel entries corresponding to various prefix lengths.

IPv4 and UDP headers for tunneling are appended to the front end of the original IPv6 packet and converted into an IPv4 format based on a local IPv4 address, a destination IPv4 address, a local UDP port number, and a destination UDP port number 312 and 314 recorded in the thus-retrieved tunnel entry information (402).

The converted packet is delivered to the IPv4 protocol stack 304, and packet transmission is requested (403).

The IPv4 protocol stack 304 transmits the tunneled packet to the gateway 308 through the physical network interface 306 and an IP4 network. The gateway 308 having received the packet removes the IPv4 header and UDP header appended for tunneling, and transmits the original IPv6 packet to the destination node through an IPv6 network A.

Figure 9:
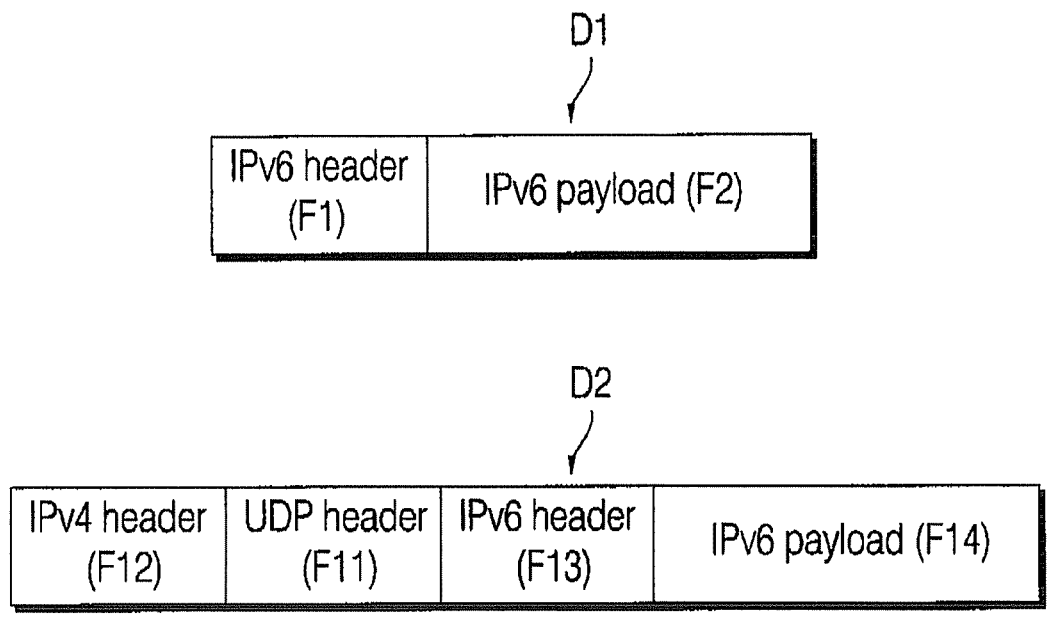
FIG. 9 is a structural view of an IPv6 packet converted so as to be tunneled through an IPv4 network in the present invention.

FIG. 9 illustrates an IPv6 packet of an application program that has passed through a tunnel network interface.

That is to say, a data packet D1 consisting of an iPv6 header field F1 and an IPv6 payload field F2 is added with IPv4 information or UDP information included in tunneling information, and converted into a packet D2 consisting of a UDP header field F11, an IPv4 header field F12, an IPv6 header field F13, and an IPv6 payload F14.

In the case that an NAT apparatus, which is an address conversion apparatus, is connected to the IPv4 network, the UDP header is added. Otherwise, only the IPv4 header is added.

This invention can be implemented in computer-readable codes in a computer-readable recording medium. Here, the computer-readable recording medium includes all kinds of recording devices for storing data readable by a computer system. Examples of the computer-readable recording medium include a ROM, a RAM, a CDROM, magnetic tapes, a hard disk, floppy disks, and optical data storage devices, and a means implemented in the form of carrier waves, for example, transmission via Internet. The computer-readable recording medium may be distributed among computer systems connected to a network, and computer-readable codes may be stored and executed in a decentralized fashion.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention.

INDUSTRIAL APPLICABILITY

In a conventional method for managing a tunnel entry in a server or terminal for ensuring the mobility of a terminal using tunneling, the IPv6 prefix concept does not exist, and hence there is the inconvenience of having to manage tunnel entries for the destination nodes located within the same IPv6 prefix network one by one. Thereupon, in the present invention, an IPv6 prefix length, as well as an IPv6 address value, is managed as a key value when managing the tunnel entries.

Accordingly, it is possible to eliminate the load of having to manage tunnel entry information for the destinations nodes located within the same IPv6 prefix one by one, and thus reduce the waste of memory resources.

Furthermore, because the number of tunnel entries requiring management is reduced, the retrieval time of a tunnel entry can be shortened.

The invention claimed is:

1. An IPv6 packet conversion method for tunneling an IPv6 packet through an IPv4 network, comprising:
    searching a tunneling information table which uses a prefix value of a network connected to a destination node to which the IPv6 packet is to be transmitted as a tunnel entry; and
    converting the IPv6 packet into an IPv4 format according to the searched tunneling information,
    wherein the searching comprises, searching for a tunneling information having a prefix value of a network, the prefix value of the network which matches the IPv6 address of the destination node to which the IPv6 packet is to be transmitted the longest, as the tunnel entry and a tunneling information including an IPv4 address to be appended to the IPv6 packet to be transmitted to a destination node through the tunneling information table,
    wherein the tunneling information stored in the tunneling information table uses a prefix value of the network as a tunnel entry, and consists of at least IPv4-related information among a local IPv4 address, a destination IPv4 address, a local UDP port number, and a destination UDP port number.

2. The method of claim 1, wherein the network connected to the destination node is an IPv6 network.

3. The method of claim 1, wherein the converted IPv6 packet consists of 'an IPv6 payload, an IPv6 header, and an IPv4 header', or 'an IPv6 payload, an IPv6 header, an UDP header, and an IPv4 header'.

4. The method of claim 1, wherein the IPv6 packet conversion method further comprising:
    grouping destination node tunneling information required in IPv6 packet conversion in units of a prefix value of the network connected to the destination node, and
    storing the grouped tunneling information in the tunneling information table.

5. The method of claim 1, wherein, the searching comprises,
    searching for a tunneling information having a prefix value of a network, the prefix value of the network which matches the IPv6 address of the destination node to which the IPv6 packet is to be transmitted, as the tunnel entry.

6. The method of claim 1, wherein, in the conversion,
the IPv4 address or UDP port number among the searched tunneling information is included in the header of the IPv6 packet to be transmitted.

7. The method of claim 1, wherein the IPv6 packet conversion method further comprising:
grouping destination node tunneling information required in IPv6 packet conversion in units of a prefix value of the network connected to the destination node and a length information of the prefix value, and
storing the same in the tunneling information table.

8. A system for tunneling an IPv6 packet through an IPv4 network, comprising:
an IPv6 protocol stack for determining which network interface an IPv6 packet requested to be transmitted is to be transmitted through by searching an FIB6 (Forwarding Information Base for IPv6);
a tunnel network interface for, if the IPv6 protocol stack determines that the IPv6 packet is to be transmitted through tunneling, searching a tunneling information table which uses a prefix value of a network connected to the destination node of the IPv6 packet as a tunnel entry, and converting the IPv6 packet into an IPv4 format according to the searched tunneling information; and
an IPv4 protocol stack for transmitting the IPv6 packet converted in the tunnel network interface to the destination node through a physical network interface,
wherein the tunnel network interface searches for a tunneling information having a prefix value of a network, the prefix value of the network which matches the IPv6 address of the destination node to which the IPv6 packet is to be transmitted the longest, as the tunnel entry and a tunneling information including an IPv4 address to be appended to the IPv6 packet to be transmitted to a destination node through the tunneling information table.

9. The system of claim 8, wherein the network connected to the destination node is an IPv6 network.

10. The system of claim 8, wherein the converted IPv6 packet consists of 'an IPv6 payload, an IPv6 header, and an IPv4 header', or 'an IPv6 payload, an IPv6 header, an UDP header, and an IPv4 header'.

11. The method of claim 8, wherein the tunnel network interface groups destination node tunneling information required in IPv6 packet conversion in units of a prefix value of the network connected to the destination node and stores the same in the tunneling information table.

12. The system of claim 8, wherein the tunneling information stored in the tunneling information table uses a prefix value of the network as a tunnel entry, and consists of at least IPv4-related information among a local IPv4 address, a destination IPv4 address, a local UDP port number, and a destination UDP port number.

13. The system of claim 12, wherein the tunnel network interface allows the IPv4 address or UDP port number among the searched tunneling information to be included in the header of the IPv6 packet to be transmitted.

14. The system of claim 8, wherein the tunnel network interface groups destination node tunneling information required in IPv6 packet conversion in units of a prefix value of the network connected to the destination node and length information of the prefix value,
and stores the tunneling information in the tunneling information table.

15. The system of claim 8, wherein the IPv4 protocol stack transmits the IPv4 packet through the physical network interface.

16. The system of claim 8, wherein the system for tunneling an IPv6 packet through an IPv4 network is at least one of a router, gateway, and host for transmitting an IPv6 packet through an IPv4 network.

17. A method for establishing an IPv4 packet tunneling path in order to transmit an IPv4 packet through an IPv4 network, comprising the steps of:
searching a tunneling information table which uses a prefix value of a network to which a destination node to which the IPv4 packet is to be transmitted as a tunnel entry; and
establishing a tunneling path according to the searched tunneling information to transmit the IPv4 packet,
wherein, the searching comprises, searching for a tunneling information having a prefix value of a network, the prefix value of the network which matches the IPv4 address of the destination node to which the IPv4 packet is to be transmitted the longest, as the tunnel entry and a tunneling information including an IPv4 address to be appended to the IPv6 packet to be transmitted to a destination node through the tunneling information table.

18. The method of claim 17, wherein the method for establishing an IPv4 packet tunneling path further comprising:
grouping destination node tunneling information required upon establishing an IPv4 packet tunneling path in units of a prefix value of the network connected to the destination node, and
storing the grouped tunneling information in the tunneling information table.

19. The method of claim 17, wherein, the searching comprises,
searching for a tunneling information having a prefix value of a network, the prefix value of the network which matches the IPv4 address of the destination node to which the IPv4 packet is to be transmitted, as the tunnel entry.

20. The method of claim 17, wherein the method for establishing an IPv4 packet tunneling path further comprising:
grouping destination node tunneling information required upon establishing an IPv4 packet tunneling path in units of a prefix value of the network connected to the destination node and length information of the prefix value,
and storing the grouped tunneling information in the tunneling information table.

21. The method of claim 7, wherein, the searching comprises,
searching for a tunneling information having a prefix value of a network, the prefix value of the network which matches the IPv4 address of the destination node to which the IPv4 packet is to be transmitted the longest, as the tunnel entry.

* * * * *